(12) United States Patent
LeBert et al.

(10) Patent No.: US 10,747,841 B2
(45) Date of Patent: *Aug. 18, 2020

(54) SYSTEMS AND METHODS FOR MODIFYING AND RESTORING WEBSITE CONTENT VIA A WEBSITE DIRECTORY

(71) Applicant: Go Daddy Operating Company, LLC, Scottsdale, AZ (US)

(72) Inventors: Don LeBert, Phoenix, AZ (US); Domingo Kiser, Tempe, AZ (US); Ganesh Devarajan, Phoenix, AZ (US); Todd Redfoot, Phoenix, AZ (US)

(73) Assignee: Go Daddy Operating Company, LLC, Scottsdale, AZ (US)

(*) Notice: Subject to any disclaimer, the term of this patent is extended or adjusted under 35 U.S.C. 154(b) by 161 days.

This patent is subject to a terminal disclaimer.

(21) Appl. No.: 15/823,819

(22) Filed: Nov. 28, 2017

(65) Prior Publication Data

US 2018/0089209 A1    Mar. 29, 2018

Related U.S. Application Data

(63) Continuation of application No. 15/159,663, filed on May 19, 2016, now Pat. No. 9,858,354, which is a
(Continued)

(51) Int. Cl.
*G06F 16/00* (2019.01)
*G06F 16/958* (2019.01)
*G06F 11/14* (2006.01)
*G06F 16/9535* (2019.01)
*G06F 40/166* (2020.01)
(Continued)

(52) U.S. Cl.
CPC .......... *G06F 16/958* (2019.01); *G06F 8/70* (2013.01); *G06F 11/1469* (2013.01); *G06F 16/9535* (2019.01); *G06F 40/166* (2020.01); *H04L 67/02* (2013.01); *H04L 67/42* (2013.01); *G06F 8/71* (2013.01); *G06F 11/1471* (2013.01)

(58) Field of Classification Search
CPC .. G06F 11/1469; G06F 11/1471; G06F 17/24; G06F 8/71; G06F 16/9535; G06F 16/958; G06F 17/30867

See application file for complete search history.

(56) References Cited

U.S. PATENT DOCUMENTS 6,366,933 B1 * 4/2002 Ball ............... G06F 16/957
715/203
6,480,847 B1 * 11/2002 Linenbach ........ G06F 16/2343
707/600

(Continued)

*Primary Examiner* — Merilyn P Nguyen
(74) *Attorney, Agent, or Firm* — Greenberg Traurig, LLP

(57) ABSTRACT

Systems and method of the present invention provide for one or more server computers configured to identify, within a database transaction log, a dynamic website content in a database and a command modifying the dynamic website content, write the dynamic website content and the command modifying the dynamic website content to a website repository as a delta, receive a request to reverse the command modifying the dynamic website content, identify, within the delta, the command modifying the dynamic website content, and generate and execute a database query configured to reverse the command modifying the dynamic website content.

16 Claims, 3 Drawing Sheets

Related U.S. Application Data continuation of application No. 13/897,246, filed on May 17, 2013, now Pat. No. 9,378,100.

(51) Int. Cl.
| | | |
|---|---|---|
| *G06F 8/70* | (2018.01) | |
| *H04L 29/08* | (2006.01) | |
| *H04L 29/06* | (2006.01) | |
| *G06F 8/71* | (2018.01) | |

(56) References Cited

U.S. PATENT DOCUMENTS

| | | | |
|---|---|---|---|
| 10,318,586 B1* | 6/2019 | Rose | G06F 16/285 |
| 2008/0256138 A1* | 10/2008 | Sim-Tang | G06F 11/1435 |
| 2013/0212068 A1* | 8/2013 | Talius | G06F 16/1734 |
| | | | 707/639 |
| 2015/0067042 A1* | 3/2015 | Tong | H04L 51/28 |
| | | | 709/203 |

\* cited by examiner

SYSTEMS AND METHODS FOR MODIFYING AND RESTORING WEBSITE CONTENT VIA A WEBSITE DIRECTORY

CROSS REFERENCE TO RELATED PATENT APPLICATIONS

This patent application is a continuation of, and claims priority to, U.S. patent application Ser. No. 15/159,663 filed May 19, 2016 and titled "TOOLS FOR STORING, ACCESSING AND RESTORING WEBSITE CONTENT VIA A WEBSITE REPOSITORY," now U.S. Pat. No. 9,858,354, which is a continuation of, and claims priority to, U.S. patent application Ser. No. 13/897,246 filed May 17, 2013 and titled "TOOLS FOR STORING, ACCESSING AND RESTORING WEBSITE CONTENT VIA A WEBSITE REPOSITORY," now U.S. Pat. No. 9,378,100.

FIELD OF THE INVENTION

The present inventions generally relate to website hosting and source code repositories and, more particularly, systems and methods for storing and accessing website content in a website repository, and rolling back changes to the website content as selected by a user.

SUMMARY OF THE INVENTION

An example embodiment of a method of storing, accessing and restoring website content via a website repository may comprise the steps of one or more server computers identifying, within a database transaction log: a dynamic website content in a database and a command modifying the dynamic website content; writing the dynamic website content and the command modifying the dynamic website content to a website repository as a delta; receiving a request to reverse the command modifying the dynamic website content; identifying, within the delta, the command modifying the dynamic website content; generating a database query configured to reverse the command modifying the dynamic website content; and executing the database query.

An example embodiment of a system for storing, accessing and restoring a website content via a website repository may comprise one or more server computers communicatively coupled to a network and configured to: identify, within a database transaction log: a dynamic website content in a database and a command modifying the dynamic website content; write the dynamic website content and the command modifying the dynamic website content to a website repository as a delta; receive a request to reverse the command modifying the dynamic website content; identify, within the delta, the command modifying the dynamic website content; generate a database query configured to reverse the command modifying the dynamic website content; and execute the database query.

The above features and advantages of the present inventions will be better understood from the following detailed description taken in conjunction with the accompanying drawings.

DETAILED DESCRIPTION

Figure 1:
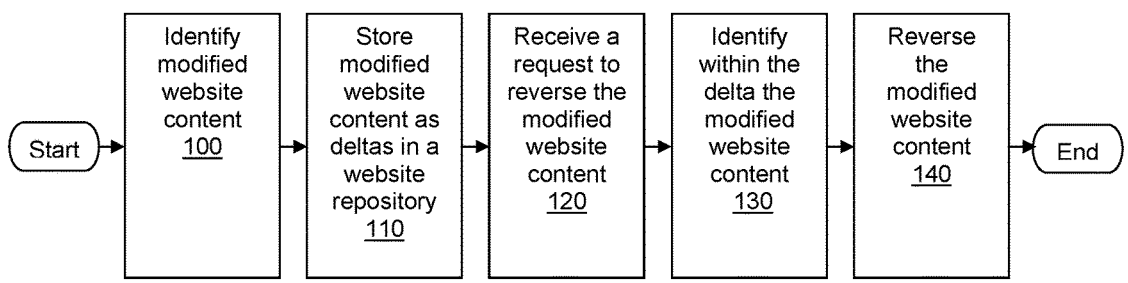
FIG. 1 is a flow diagram illustrating a possible embodiment of a method for storing, accessing and restoring website content via a website repository.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between people or organizations that make use of network or computer resources (users). Hundreds of millions of people around the world have access to computers connected to the Internet via Internet Service Providers (ISPs). Content providers (e.g., website owners or operators: the users or administrators responsible for the website content) place multimedia information (e.g., text, graphics, audio, video, animation, and other forms of data) at specific locations on the Internet referred to as websites. Websites comprise a collection of connected or otherwise related, web pages. The combination of all the websites and their corresponding web pages on the Internet is generally known as the World Wide Web (WWW) or simply the Web.

The Internet provides opportunities for users to backup files, including website content files, via remote, online, or managed backup services (sometimes referred to as "cloud backup") which provide users with a system for the backup, storage, and recovery of computer files. These backup systems are typically built around a client software program that runs on a schedule, typically once a day, and usually at night while computers aren't in use. This program typically collects, compresses, encrypts, and transfers the data to the remote backup service provider's servers or off-site hardware.

Applicant has determined, however, that presently-existing website content backup systems and methods do not allow users to track and reverse individual changes to the web site content, but instead back up an aggregate of the entire content of the web site, requiring significant amounts of storage space. Furthermore, presently-existing website content backup systems only monitor the need to back up the website content at a fixed interval (e.g., daily). These systems and methods may recognize changes during the fixed interval, but will then replace the entirety of the website content without consideration for each individual change. Possibly more problematic, any malicious changes to a website by "hackers" will not be recognized until the next review of the content at the fixed interval, so if content were maliciously changed shortly after a current check, there would be no way to know of the changes until the next fixed interval. Even when detected, the website owner must backup entire files or database entries, and sometimes the entire web site and/or database to replace the corrupted files. In short, backup services include the following weaknesses: backups are normally triggered on a timed basis; backups are usually system-wide or partition-wide and backups are normally written to separate media.

Applicant has therefore determined that optimal systems and methods may improve on presently-existing website content backup systems and methods by automatically logging each change to the content of the website as a "delta" within a website repository. These changes may include changes to website files and changes to dynamic content stored in a database for the website. The website owner may also be notified when changes occur to the website content, making it easier for the website owner to identify malicious changes by someone other than the website owner. The website owner may then "roll back" the changes to the website content as described herein by reversing the "deltas" for the website files, the dynamic database content for the files or both. Use of a website repository also provides repository functionality for the website as typically found in source code repositories, such as commands to commit, tag, branch, export, merge, etc.

Thus, optimal systems and methods may replace current backup systems for customers, placing the power in their hands by providing a user interface configured to control their website as a website repository integrated into website administration control panel which provides a backup solution within a clean common interface, comprising the means to build, maintain and restore any changes within the entire site. In other words, the entire site may act as a web site repository.

Several different methods may be used to provide and manage the disclosed inventions. In an example embodiment illustrated in FIG. 1, any combination of software modules running on one or more server computers, as described below, may identify one or more modifications to a website content (Step 100); store the modification(s) to the website content as a delta within a website repository (Step 110); receive a request to reverse the modification(s) to the website content (Step 120); identify, within the delta in the website repository, the modification to the website content (Step 130); and reverse the modification to the website content (Step 130).

Figure 2:
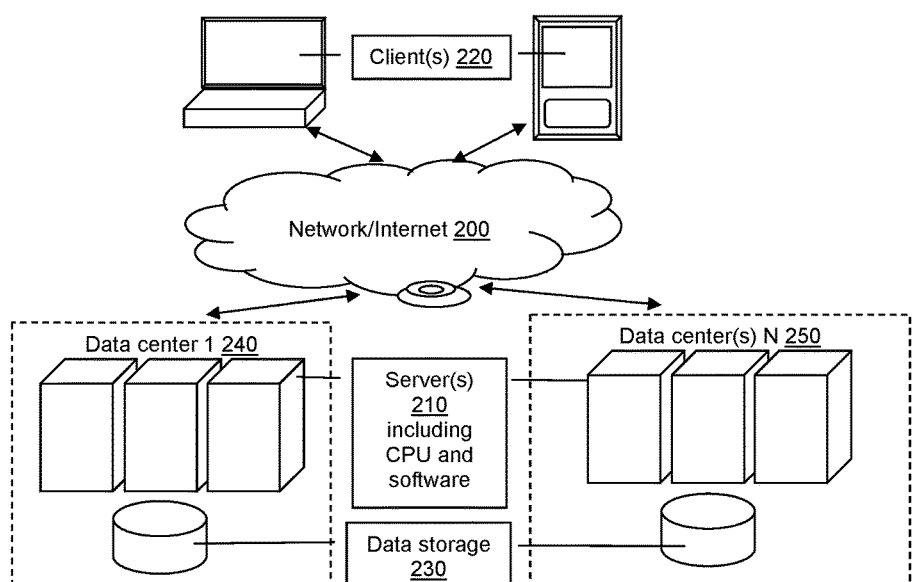
FIG. 2 illustrates a possible embodiment of a system for storing, accessing and restoring website content via a website repository.

Several different environments may be used to accomplish the steps of embodiments disclosed herein. FIG. 2 demonstrates a streamlined example of such an environment and illustrates a non-limiting example of a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules) in computer-readable media accessible to the CPU, such as a hard disk drive on a server 210 and/or client 220.

The example embodiments herein place no limitations on whom or what may comprise users. Thus, as non-limiting examples, users may comprise any individual, entity, business, corporation, partnership, organization, governmental entity, and/or educational institution.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 210 and client(s) 220 (along with software modules and the data storage 230 disclosed herein) may be communicatively coupled to the network 200 and to each other in such a way as to allow the exchange of information required to accomplish the method steps disclosed herein, including, but not limited to receiving the information from a user interface on one or more clients 220, and one or more servers 210 receiving the information as transmitted by the client(s) 220.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, "smart" phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof.

The client computer(s) 220 which may be operated by one or more users and may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, a "smart" phone, an Internet access device, a rich client, thin client, or any other client functional with a client/server computing architecture. Client software may be used for authenticated remote access to one more hosting computers or servers, described below. These may be, but are not limited to being accessed by a remote desktop program and/or a web browser, as are known in the art.

The user interface displayed on the client(s) 220 or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in and after FIG. 4, including Touch interfaces, Conversational Interface Agents, Live User Interfaces (LUI), Command line interfaces, Non-command user interfaces, Object-oriented User Interfaces (OOUI) or Voice user interfaces. Any information generated by the user, or any other information, may be accepted using any field, widget and/or control used in such interfaces, including but not limited to a text-box, text field, button, hyper-link, list, drop-down list, check-box, radio button, data grid, icon, graphical image, embedded link, etc.

The software modules used in the context of the current invention may be stored in the memory of—and run on—at least one server 210 and/or client 220. The software modules may comprise software and/or scripts containing instructions that, when executed by a microprocessor on a server 210 and/or client 220, cause the microprocessor to accomplish the purpose of the module or the methods disclosed herein.

Figure 3:
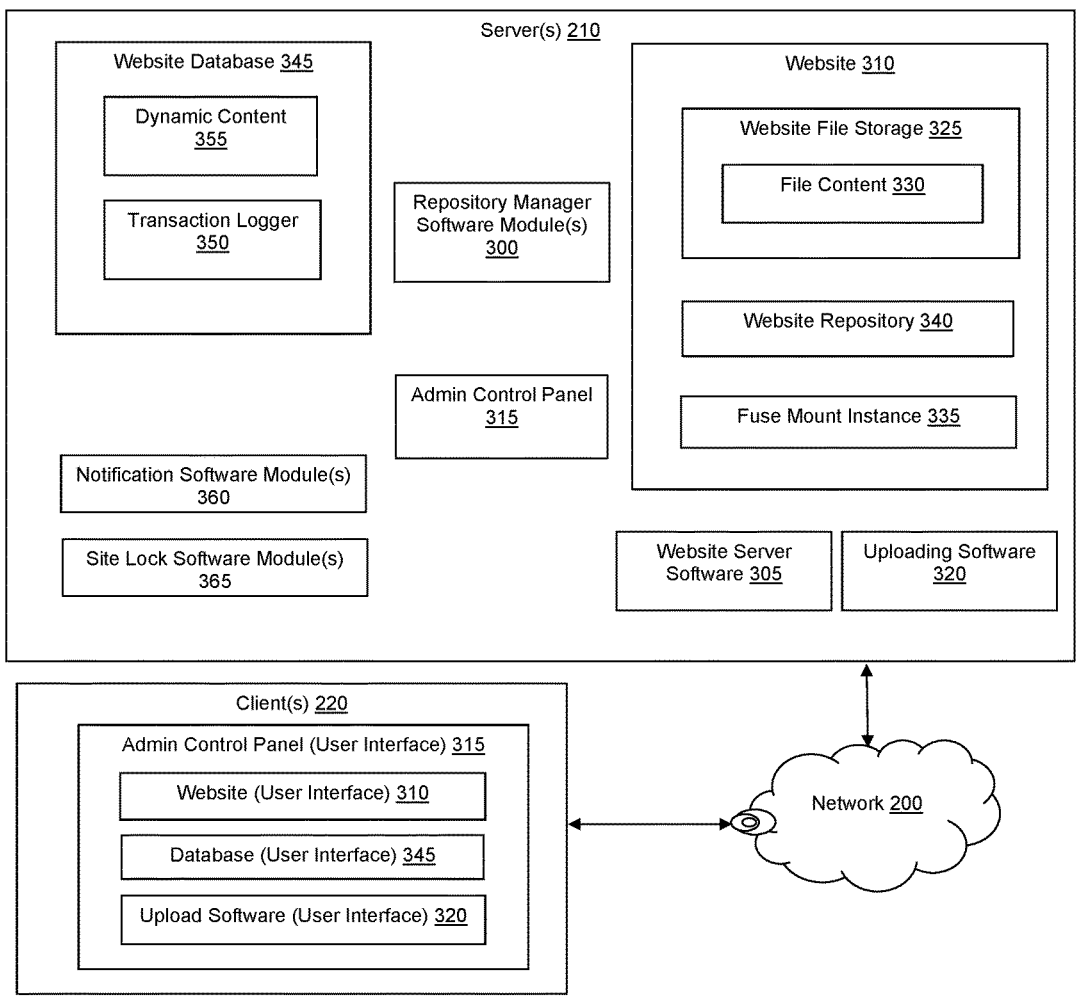
FIG. 3 illustrates a more detailed possible embodiment of a system for storing, accessing and restoring website content via a website repository.

As a non-limiting example, the environments in FIGS. 2-3 may include one or more repository manager 300 software modules (a backend application running on the server(s) 210 and configured to manage and otherwise administrate all software and hardware elements of the disclosed invention) capable of connecting through the network to any of the disclosed hardware or software within the disclosed environment. Any of the disclosed method steps that the server is configured to accomplish may be run on the server(s) 210 according to logic within the repository manager 300. Furthermore, the repository manager 300 may be configured to communicate and interact with all other disclosed hardware and software.

The software modules may also include mobile applications, possibly on a client computer and/or mobile device. These mobile applications, or "apps" may comprise computer software designed to help people perform an activity and designed to help the user to perform singular or multiple related specific tasks. It may help to solve problems in the real world by manipulating text, numbers, graphics, or a combination of these elements.

The server(s) 210 may host and run an Application Programming Interface (API) available any of the disclosed system components. An API may comprise a service made available to third parties, which may further comprise any individual, entity, system, hardware, or software wishing to access the disclosed information and functionality. Such an API 300 may comprise a software-to-software interface that specifies the protocol defining how independent computer programs interact or communicate with each other. It also may comprise a collection of pre-configured building blocks allowing a third party to easily configure their software for compatibility and/or extensibility. The API may allow a requesting party's software to communicate and interact with the software application and/or its provider—perhaps over a network—through a series of function calls (requests for services). It may comprise an interface provided by the software application and/or its provider to support function calls made of the software application by other computer programs.

The API may comprise any API type known in the art or developed in the future including, but not limited to, request-style, Berkeley Sockets, Transport Layer Interface (TLI), Representational State Transfer (REST), Simple Object Access Protocol (SOAP), Remote Procedure Calls (RPC), Standard Query Language (SQL), file transfer, message delivery, and/or any combination thereof. The API may comprise computer-readable code that, when executed, causes the API to receive an RPC (i.e., function call) requesting information services. Responsive to receipt of the RPC, the API may perform the above described processes, and transmit a request results to the requesting third party. To submit the request via an RPC to the API, the server(s) 210 may require authentication with the API. Computers or servers may locate the API via an access protected URL mapped to the API, and may then use an API key configured to authenticate the one or more computers or servers prior to accessing the API.

The server(s) utilized within the disclosed system 210 may comprise any computer or program that provides services to other computers, programs, or users either in the same computer or over a computer network 200. As non-limiting examples, the server(s) 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof). The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The server(s) 210 or software modules within the server(s) 210 may receive hypertext transfer protocol (HTTP) requests for files or other data stored on the server(s) 210 and may use server-side scripting languages such as ASP, PHP, CGI/Perl, proprietary scripting software/modules/components etc. to render the files requested and respond with the rendered files/pages to be displayed on the client(s) 220.

The server(s) 210 or software modules within the server(s) 210 may use query languages such as MSSQL or MySQL to retrieve the content from data storage 230. Server-side scripting languages such as ASP, PHP, CGI/Perl, proprietary scripting software/modules/components etc. may be used to process the retrieved data. The retrieved data may be analyzed in order to determine information recognized by the scripting language, information to be matched to those found in data storage, availability of requested information, comparisons to information displayed and input/selected from the user interface or any other content retrieval within the method steps disclosed herein.

The server 210 and/or client 220 may be communicatively coupled to data storage 230 to retrieve any information requested. The data storage 230 may be any computer components, devices, and/or recording media that may retain digital data used for computing for some interval of time. The storage may be capable of retaining stored content for any data requested, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

As seen in FIG. 2, the software modules, server(s) 210 and/or data storage 230 may exist and/or be hosted in one or more data centers 240, 250. These data centers 240, 250 may provide hosting services for websites, services or software relating to stored information, or any related hosted website including, but not limited to hosting one or more computers or servers in a data center 240, 250 as well as providing the general infrastructure necessary to offer hosting services to Internet users including hardware, software, Internet web sites, hosting servers, and electronic communication means necessary to connect multiple computers and/or servers to the Internet or any other network 200.

As users access and/or input information, this information may be redirected and distributed between and among the data centers 240, 250 via commands from any combination of software modules hosted on the server(s) 210 and executed via processors on the server(s) 210. This information may then be accessed and manipulated by the combination of software modules or stored in the data storage 230 of any of a plurality of data centers, either separate from or integrated into the one or more servers, so that the information is available to be searched and accessed by the user and/or any other components of any or all data centers.

Any references to "software combination," "combination of software," "combination of software modules" etc. referred to herein may include any combination of software modules executed by a microprocessor on either the server 210 or client 220 computers. These software modules may also be used in combination with any other method steps, hardware and/or software structures disclosed herein. The servers 210 may be hosted in any data center 240, 250 operated by any hosting provider such as those disclosed herein and the servers 210 and clients 220 may be operated by any users disclosed herein.

In the interest of simplicity, FIG. 3 shows a consolidated environment for accomplishing the methods disclosed herein, where the disclosed software modules (including repository manager 300), control panel 315, uploading (e.g., FTP/SSH) software 320, web site server software (including the disclosed file storage structure) 305, website file content 330, FUSE mount 335, website repository (a server side website source and dynamic content repository) 340, website database 345 (including transaction logger 350), notification module 360 and site lock module 365, described in more detail herein) are all hosted on a single server computer 210 in a single data center 240, 250. Other embodiments, however, may utilize a highly distributed environment wherein the disclosed components are either each hosted on their own separate server 210 and communicatively coupled to one another via the network 200, or are hosted and run as any combination of the one or more servers 210.

As seen in FIG. 3, the server(s) 210 may host one or more websites 310, and may run one or more web server software 305 modules making the website(s) 310 accessible via the Internet. Non-limiting examples of entities that may provide website hosting services for the disclosed invention may include a hosting provider, a software development company, an e-commerce company, a domain name registry, a domain name registrar, an SSL (secure sockets layer) or other online security CA (Certification Authority) or any combination thereof. Non-limiting examples of the services provided by such a service provider may include, as non-limiting examples, web hosting and maintenance services, website development and maintenance services, domain name registration and maintenance services, SSL certificate validation, signing and issuance services, installation of SSL certificates on hosted websites, DNS services (e.g., domain name/URL resolution, and/or hosting a DNS software, database server, relevant zone, or other DNS files and/or a DNS database), etc. To manage these services, an admin (a website owner's administrative account) may be created and maintained for one or more website owners (e.g., a website administrator or developer).

This admin may include and/or be associated with, as non-limiting examples: a hosting account comprising a website file storage 325 for the website file content 330; one or more control panels (e.g., an admin account control panel for the hosted website(s) 310, such as GO DADDY'S MANAGE YOUR ACCOUNT administration software) 315; access (possibly via the admin account control panel 315) to administrate one or more content upload software modules 320 for the hosted website 310 (e.g., FTP (File Transfer Protocol), SSH (Secure Shell Protocol) and/or SFTP (SSH File Transfer Protocol)) and configured to upload website file content 330; a website database 345 comprising at least dynamic content 355 for the website 310; website database 345 access (e.g., via a database administration program, possibly integrated into the admin control panel(s) 315).

The server(s) 210 may generate and transmit the control panel(s) 315 to any client 220. After the website owner has been authenticated to the website 310, the admin may provide access to one or more control panel 315 interfaces for each of the various services provided through the admin. The website owner may use the control panel 315, possibly via uploading software 320, to upload file content 330 to the website file storage 325. The control panel 315 may also be used writing, executing and/or administrating transactions (e.g., selecting or modifying dynamic content 355 for the website 310) within the website database 345. The control panel(s) 315 may comprise, as non-limiting examples, a web page, a client side program, an "app," a server administration interface, etc.

In the context of the currently disclosed invention, the admin and the admin control panel(s) 315 may further include and/or be associated with: a FUSE (File System in User Space) mount 335 instance for the website file storage 325 for the website 310, a website repository (a server side content repository instance for the website) 340, a repository manager 300, one or more website database transaction loggers 350, one or more website content change notification modules 360; and one or more site lock modules 365, each of which are described in more detail herein. The control panel(s) 315 may be configured to administrate any of the disclosed admin software functionality as necessary.

The website file content 330 uploaded and/or stored within the website file storage 325 for each of the website(s) 310 may comprise, as non-limiting examples: HTML files and/or other text files comprising static content; client side scripting files including, as non-limiting examples, JavaScript, dHTML, Flash files, etc.; multimedia content such as website graphics or video files; server side software scripting or other software files including, as non-limiting examples, ASP, PHP Java, Perl, .exe files, etc., which may be run and/or otherwise executed by the server(s) 210 and may be configured to access and/or update dynamic content 355, described herein; or any other electronic files accessible via a web browser or other Internet access software.

Website 310 content may further comprise content displayed on the website, including, but not limited to, dynamic website content 355. This dynamic content 355 may comprise content received from and customizable to the website owner and/or to a website 310 visitor accessing and using the website. This dynamic content 355 may be stored, selected and/or modified in one of at least two ways. A website 310 visitor may access the website file content 330 (possibly a file for generating a web page interface and running one or more software scripts) stored in the website file storage 325. The software scripts or other software within this file content may be configured to receive dynamic content 355 from the website 310 visitor accessing the file content 330, possibly via a one or more graphical user interface elements within an HTML form, for example, in the displayed web page interface. As a non-limiting example, an HTML form may receive comments about website content or a blog entry on a blog website from the website 310 visitor. After completing the comment/blog entry, the website 310 visitor may select a "submit" button or other form element configured to transmit the dynamic content 355 and/or other form data to the server(s) 210 for processing.

The server(s) 210 may receive the information from the HTML form, and, in response to an HTTP or other request transmitted with the form information, may execute the server side scripting and/or other software within the file content 330. This server side scripting or other software may be configured to connect with the database and write or otherwise modify the received dynamic content 355 within a website database 345. By executing additional instructions from the server side scripting or other software, this dynamic content 355 stored in the website database 345 may be selected and displayed as content on the website 310 or may be modified (e.g., inserted, updated and/or deleted). These modifications may be accomplished using database queries (e.g., SQL queries), as are known in the art.

Another way that dynamic content 355 may be modified is by the website owner through the control panel 315. If the website owner chooses to update dynamic content 355 displayed on the website 310, the website owner may use a user interface within the control panel 315 to input such dynamic content 355. The control panel 315 may then be configured to transmit the received dynamic content 355 to the server(s) 210 for processing to insert or otherwise modify, as previously described, the dynamic content 355 within the website database 345.

In some embodiments, file content 330 for the hosted website(s) 310 may be stored within website file storage 325 accessible to website server software 305 and associated with the admin for the website owner. Such file content 330 may be stored in any data storage medium capable of storing data or instructions for access and/or execution by a computing device, such as server(s) 210 and/or client(s) 220. Such data storage may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage, perhaps in a network storage device communicatively coupled to the network 200, such as a hard drive or other memory on the server(s) 210.

Stored file content 330 may be organized in a server's file system, which may organize the files for the storage, organization, manipulation, and retrieval by the server's operating system and/or website server software 305. The server's file system may comprise at least one directory, which in turn may comprise at least one folder in which file content 330 may be stored. In most operating systems, files may be stored in a root directory, sub-directories, folders, or subfolders within the file system.

Most file systems have systems and methods of administering access permissions or access rights to specific users and/or groups of users including, as non-limiting examples, FTP reads/writes and HTTP post/get commands. Such systems control the ability of users to view, edit, add to, delete, or otherwise make changes to files in the directories and/or folders of the file system. There are numerous different access permission types that may apply to directories, folders, or files. For example, the "read" permission may grant a user (or server software 305, FUSE mount 330 and/or repository software 340, described below) the ability to read a file. This read permission may allow a user or software to pull file content 330, or acquire a handle to a particular file.

The "write" permission may grant the ability to write or otherwise modify the file content 330. The "modify" permission may grant the ability to read, write to, update and delete files. The "read and execute" permission may grant the ability to execute a file. The "full control" permission may enable a user or software to read, write to, change, and delete files and folders. Depending on the server's operating system and file system, other access permission conventions may be used (e.g., write, read, execute, update, delete, or drop), but they all generally control who may read, run, modify, or delete files stored on the server(s) 210. Using various embodiments of the disclosed invention, the file system may also rollback the file content as directed by the repository manager 300.

As a non-limiting example, the instructions for uploading file content to the website file storage 325 may include instructions from the uploading software 320 for the server(s) 210 to initiate a write of the file content 330 to the website file storage 325. When the file content 330 is requested to be displayed on client software such as an Internet browser, this may likewise be accomplished via a "read" action command.

A FUSE mount 335 instance associated with each hosted website 310 and the associated website file storage 325 (as well as website repository 340, described below) may run on the server(s) 210 between the uploading software 320 (the source of the read, right or other file system modification action commands) and the website file storage 325. The FUSE mount 335 instance for the website 310 may be configured to interact with an operating system kernel running on the server(s) 210, and may be configured to interrupt the write, read or other file system modification action command(s) and write the file to, and as requested, read the file from, the website file storage 325, according to customized instructions stored within the FUSE mount 335. Thus, the FUSE mount 335 may be configured to "hook into" the upload transaction via the operating system kernel by identifying and intercepting the action command to write, read or otherwise modify the uploaded file content for the website 310 according to the customized instructions. Specifically, these instructions may define how to write the file to or read the file from the website repository 340 as described herein. Non-limiting examples of FUSE may include Fuse for FreeBSD, Fuse4X, OSXFuse, MacFUSE, Dokan, fuse4win, FUSE api and MINIX 3.

The FUSE mount 335 may comprise one or more software modules configured for users, such as the website owner or server administrator creating the website file storage 325, to create a virtual file system in "user space" for the file content 330. This virtual file system may not store the file content 330 itself, but may act as a view or translation of an existing file system or storage device, in this case the file content 330 stored within the website repository 340. In contrast to most file system structures, rather than the user interacting almost directly with the file system, the FUSE mount 335 may comprise an abstraction layer (the virtual file system) superimposed on the website file storage 325. This abstraction layer may allow applications to access the concrete file content 330 through the website repository 340 in a uniform way. The FUSE mount 335 may also abstract Input/Output (I/O) commands to the website file storage 325. Specifically, the FUSE mount 335 instance may abstract the write and read (or any other modifying) commands by intercepting these commands and abstracting such commands into website repository commands. In other words, the FUSE mount 335 allows the user to write and read files via interim steps performed through the website repository 340 without the website owner's knowledge and without the read and write commands having to know what types of file system they are accessing.

Instead of the user interacting directly with the file system (the website file content 330), the write command may become wrapped by the FUSE mount 335 instance as a transaction that is translated into a website repository 340 command and is executed within the website repository 340. The interim step performed by the FUSE mount 335 that translates the command intended for the website file storage 325 to the website repository 340 command constitutes the abstraction layer. Any read command is likewise pulled through the website repository 340 and abstracted so that the website owner does not know that the abstracted website repository 340 interim step is happening.

This data abstraction may also provide a security layer keeping "hackers" from maliciously changing file content 330 or dynamic content 355. A hacker would have to come through the repository layer to corrupt any files, but because of the abstraction layer, would be unaware of what he was writing to. As described below, the repository content comprises flat files and/or binary data. Because of this, a hacker modifying the flat files or binary data would have no effect on the file content 330 stored as website 310 files within the website repository 340 directly.

Using the FUSE mount 335 abstraction layer, each website 310 file update via a read, write or other modification command may be automatically logged in real time in the website repository 340 as a delta to the website 310 file. The website repository 340 may be associated with the website file storage 325. However, rather than saving updates to the file content 330 to the website file storage 325, the website repository 340 may comprise "hooks" or flat files and/or binary data to store deltas to the website content, as described below.

Specifically, the online repository may comprise a file archive and web hosting facility where changes to file content 330 (i.e., files' current and historical data) are stored, allowing website owners to submit code or patches of code in an organized fashion and allowing editors to track each others' edits. Non limiting examples of online source code repositories may comprise Git, Subversion, SVN, CVS, TFS, SVK, AccuRev, Perforce, Mercurial, etc.

The website repository 340 may also comprise revision control, release management and/or a versioning system to track and/or provide control over changes to source code, managing changes to documents, computer programs, large web sites, different versions of code and/or other collections of information. These revisions and/or versions may be compared, restored and merged. The website repository 340 may be configured to take periodic "snapshots" whose contents may be accessed with similar semantics to normal file access.

The website repository 340 may be configured to execute standard repository functionality. For example, the repository software may make changes to the "baseline" or approved revision of a document or source file from which subsequent changes can be made. Once each working copy is satisfactory to the website owner, actions (notifications, denies, rollbacks, etc.) may be based upon a new revision of the file content 330 that is created as a result of writing, merging and/or committing the changes made to the file content 330. The working copy may be the local copy of files from a repository, at a specific time or revision. All work done to the file content 330 in a repository may initially be done on a working copy, hence the name. Conceptually, the working copy may comprise a sandbox.

The commit command within the website repository 340 may represent one of many non-limiting example website repository 340 commands available via the website repository 340. Other non-limiting examples may include tag, branch, merge, blame, rollback, import, export, clone or any other repository commands known in the art.

As non-limiting examples, a tag command may be used to identify a tag or label of an important snapshot in time, consistent across many files. The files at that point may all be tagged with a user-friendly, meaningful name or revision number. Tagging commands may also be used for tagging the delta transaction data described below, allowing the server(s) 210 to display and identify changes within the website repository 340 to be rolled back to a particular revision, version or "commit."

A branch command may be used to branch or fork a set of files under revision and/or version control at a point in time so that, from that time forward, two copies of those files may develop at different speeds or in different ways independently of each other, providing a "developer friendly" environment similar to a production test environment, but allowing a website owner to change and test new features on the website 310. Although the website 310 seen by users would not change while these new features were tested and changed, the website owner may create a development version of a website and be working on a working copy in a branch of the website in a separate environment. The test site could then be merged with the "live" site displaying the changes made in the test environment, possibly using a merge command within the website repository 340 to merge the different branches into a single unified "trunk."

The website repository 340 may further comprise a general-purpose differencing utility or "diff." This diff may comprise a file comparison utility that identifies, outputs and stores revisions comprising the differences between two files—in this case to show the changes between one version of a file content 330 and a former version of the same file content 330.

If a file uploaded via the uploading software 320 is an update to an existing file, and/or a "patch file" (updating of source code to a newer version) to be stored within the website repository 340, the website repository 340 may be configured to run the diff utility to identify the differences in content between the uploaded file content 330 and the most recent update stored in the website repository 340 for the file content 330. For example, for text files, such as hosted website files, the diff may generate, display and/or store the changes made per line or even by character. In other embodiments, possibly including executable files running on the website 310, additional embodiments may also support binary files.

The diff files that serve as input to patch files may be readable text files, meaning they may be easily reviewed or modified by humans before use. The patch file may comprise a text file that consists of a list of differences and may be produced by running the related diff program with the original and updated file as arguments.

The identified diff output data (e.g., modifications to the file content 330 or database transaction data, described below) may be stored as one or more "deltas" in the website repository. In common use cases, source or data files may change incrementally between commits (i.e., non working copy versions of this content). The delta stored in the repository may comprise a way of storing or transmitting and recording this data in the form of discrete files comprising the differences between sequential data rather than as complete files—for example, changing a few words in a large document, or changing a few records in a large table—thereby reducing data redundancy.

Information stored in the repository associated with the delta may include, as non-limiting examples: the name of the uploaded file or database transaction; the date/time the file or database transaction was uploaded; the contents of the file or database transaction; the delta identified from running the diff; and/or the server and/or person who uploaded the file or ran the database transaction.

Additional repository commands, or other logic in the control panel 315 and/or the repository manager 300, may be used to import and/or export the data in the repository to third parties or computers. As a non-limiting example, a user may have an "off site" repository (e.g., GitHub, CodePlex, Freepository, Source Forge, etc.) and may use included repository commands (e.g., subscribe, import, pull, export, push, clone, etc.) to synchronize with the off site repository so that the website 310 is cloned to one or more of these additional repositories, thereby creating multiple copies of the repository content. The two repositories may be configured to synchronize or to "auto sync" possibly in response to requests sent from the control panel 315.

Figure 4:
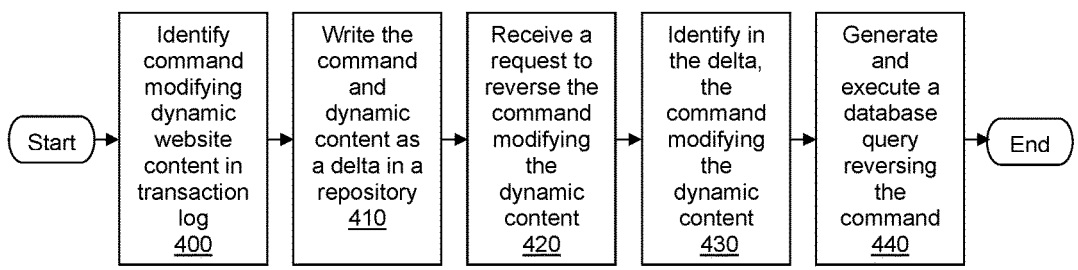
FIG. 4 is a flow diagram illustrating a possible embodiment of a method for storing, accessing and restoring website content via a website repository.

In an example embodiment illustrated in FIG. 4, any combination of software modules running on one or more server computers 210, may identify, within a database transaction log, a dynamic website content 355 in a database 345 and a command modifying the dynamic website content 355 (Step 400); write the dynamic website content 355 and the command modifying the dynamic website content 355 to a website repository 340 as a delta (Step 410); receive a request to reverse the command modifying the dynamic website content 355 (Step 420); identify, within the delta, the command modifying the dynamic website content 355 (Step 430); and generate and execute a database query configured to reverse the command modifying the dynamic website content 355 (Step 440).

The server(s) 210 may be configured to receive a request to insert and/or modify the dynamic content 355 for the website 310 stored in the website database 345. This dynamic content 355 may be updated from one of two sources: First, a visitor to the website 310 may access the file content 330 stored in the website file storage 325. The software scripts or other software within the file content 330 may be configured to receive dynamic content 355 from users accessing the file content 330, possibly via HTML form elements within the file content 330. The server(s) 210 may then be configured to execute the instructions within the file content 330.

A second source for inserting or modifying dynamic content 355 may be the website owner via the control panel 315. The website owner may input dynamic content 355 into a user interface element (possibly a website database 345 admin for receiving database queries) within the control panel 315 to insert or otherwise modify the dynamic content 355. The control panel 315 may then be configured to transmit the received dynamic content 355 to the server(s) 210 for processing to insert or modify the dynamic content 355 within the website database 345.

The software/scripts in the file content 330 and/or logic within the control panel 315 may be configured to run database transactions, such as SQL database queries, on the server(s) 210. These database transactions may select dynamic content 355 from the website database 345 or may modify the dynamic content 355 by: inserting the dynamic content into the website database 345; updating existing dynamic content 355 in the website database 345; and/or deleting dynamic content 355 from the website database 345.

As each database query is run on the dynamic content 355 in the website database 345, a transaction logger 355 within the website database 345 may generate, for the executed transaction, a database transaction record within a binlog (a text or binary transaction log of each database transaction). The binlog may record what database queries or other commands have been run and what has changed within the dynamic content 355. In some embodiments, the server(s) 210 may be configured to request and access the generated binlog.

Typically, in database replication, a database 230 generates a binlog in preparation for replicating and streaming the binlog to commit to a second database 230 as a cautionary measure, in case disaster recovery is needed for the original database. In the disclosed embodiments, the transaction logger 350 in the website database 345 may be configured to transmit the binlog, possibly as a text file, to the website repository 340. In some embodiments, the FUSE mount may expose API interfaces allowing querying metadata that hooks into underlying changes to the repository abstracted beneath.

In some embodiments, the binlog may be generated as a statement-based replication log record (often abbreviated as SBR), which corresponds to a standard statement-based binary logging format. In these embodiments, database transaction event information may include a database query statement (e.g., a SQL statement), the content modified and/or additional database transaction information listed herein. In some embodiments, a row-based logging, mixed format, mixed-based replication or mixed-format replication may be used. In row-based logging embodiments, the database transaction event may indicate a row change rather than a database query statement.

The binlog output by the transaction logger 350 may comprise a text file made up of each of the database transaction events (i.e. database query log records) run by the website database 345. In some embodiments, the binlog may comprise a "SQL dump" style file that contain multiple website database 345 modifying statements. In other embodiments, a binlog may comprise each individual database transaction; each database transaction log record may be created and transmitted to the website repository 340.

Transmitted database transaction data may comprise one or more database queries, the type of transaction in the database query, the affected content modified in each of the one or more database queries, the user and/or server that ran the query, a time stamp indicating when the transaction was executed, the elapsed time in executing the query, etc. By analogy, file uploads may contain analogous data for file uploads, such as the user and/or server that ran the upload, a time stamp indicating when the upload was executed, the elapsed time in executing the upload, whether the upload comprised an FTP processes, HTTP posts, etc.

The server(s) 210 may be configured to request and/or receive the binlog, including any database transaction data as transmitted from the transaction logger 350. The server(s) 210 may then be configured to read, identify and remove "select" database query transactions from the text, so that only database transactions that modify the dynamic content (i.e., insert, update or delete statements, for example) remain. The server(s) 210 may then be configured to read and identify the database transaction data for each of these modifying database query transactions.

The server(s) 210 may then be configured to convert the database transaction data for each of these transactions into statements usable by the website repository 340, thereby allowing the abstracted website repository 340 to "hook into" underlying changes in the website database 345, since, unlike the deltas stored for the file content 330, modifications to the website database 345 changes the website content without requiring actual code deployment by the web site owner.

To convert the information from the database binlog, the server(s) 210 may be configured to identify and store the text information for each transaction event data as a delta within the website repository 340 as described above. When the website repository 340 saves the delta, it may save it as a commit to the website 310 as described above. The appropriate dynamic content 355 for the website 310 may then display the modified dynamic content 355.

The control panel 315 may comprise interface elements and logic for the website owner to select means to "roll back" the website repository to a particular delta and/or commit. Specifically, the control panel 315 interface may configured for a web site owner to select to roll back any website content according to any of the transaction data stored as deltas within the website repository 340. Such roll backs may include changed-based or time-based rollbacks. As non-limiting examples, the website owner may select to roll back the website 310 according to the affected content modified in the database queries, the user and/or server that ran the query, the date of the diff/delta (and any interim deltas), the date of one or more database queries, a date of FTP/HTTP activity, etc. As a non-limiting example, by default, selections available to the website owner may include an interface display of deltas within the website repository 340 displayed by the most recent deltas within the website repository 340.

The website owner may select from the control panel the content displayed on the website 310 to roll back. For example, the web site owner may want to revert to a previous revision/version/date of the website 310, or may be notified that someone other than the website owner is responsible malicious changes to the website 310. The website owner may use the selections on the control panel interface to "roll back" the changes to a particular update, delta and/or commit.

The control panel may send a request to the server(s) 210 (possibly via the repository manager 300), which may then access the website repository 340 and determine all changes (deltas) selected by the website owner and transmitted to the server(s) 210. The repository may then "undo" the deltas including those selected by the user. In some embodiments, a restore (an "undo" of the deltas) may comprise the repository rolling back to a particular commit. In other embodiments, a restore may comprise the repository rolling back to a known good configuration, which may have been "tagged' or "branched" by the website owner, allowing the website owner to return to a selected development area. This may be accomplished as the server(s) 210 access the deltas stored within the website repository 340 and roll back the changes to the affected files, effectively returning them to their state on the requested version/branch/date. To roll back the changes to the affected file or database transaction, the server(s) 210 may be configured to send instructions to the repository causing the differencing software to reverse the modification made in order to "undo" the stored delta by reversing each of the deltas for either the website files and/or the database transactions.

In some embodiments, for the file content 330 deltas stored in the website repository, the server(s) 210 may be configured to update the files by reconstructing the previous instructions to patch the file. The patch file may then be "unpatched" according to instructions contained in a separate patch file in order to roll back to the selected previous versions of the file content 330.

To roll back the changes to the dynamic content 355 for the website 310, the server(s) 210 may be configured to accesses the website repository to determine the deltas stored in the database corresponding to the selected criteria to roll back. The server(s) 210 may be configured to identify, as stored in the delta, the database transaction (i.e., database query) and the dynamic content 355 associated in the website repository 340 with the delta. The server(s) 210 may then be configured to reverse the query for the dynamic content 355 associated with the delta by performing the database query's "mirror image." In other words, the server(s) 210 may be configured to transpose the identified database transaction to a restorable format as a reverse log.

As non-limiting examples, the server(s) 210 may be configured to identify, from the database transaction data stored within the appropriate delta, a database transaction which executed an insert database query for a dynamic content inserted into the website database 345. The server(s) 210 may then be configured to generate and execute the "mirror image" or a delete database query for the inserted database record in order to reverse the original insert database query. After running the delete database query for the first content, that dynamic content 355 will no longer be displayed on the appropriate web page. However, the website repository may retain both the original insert database query and the "reversed" delete database query as deltas in the web site repository.

The server(s) 210 may likewise be configured to identify, from the database transaction data stored within the appropriate delta, a database transaction which executed an update database query for a dynamic content 355 updated within the website database 345. The server(s) 210 may then be configured to generate and execute the "mirror image" or a second, previous insert or update database query for the updated database record in order to reverse the most recent insert database query. After running the generated update or insert database query for the original content, that dynamic content 355 may be displayed on the appropriate web page. However, the website repository may retain all original database queries and the "reversed" database query as deltas in the website repository.

As a non-limiting example, if the database query prior to the selected update database query was also an update database query, the server(s) 210 may be configured to identify, within a previous delta, the updated dynamic content 355 from the previous database query for that record and insert the previously updated dynamic content 355 as the current dynamic content 355.

For a delete database query, the server(s) 210 may be configured to analyze the delta history of the database transaction records for that dynamic content 355 and determine an insert or update query for that record to return the record to the content previous to the delete database query. However, the website repository may retain all original database queries and the "reversed" database query as deltas in the website repository.

A notification module may be configured to notify the website owner of changes in the website 310 content, possibly in response to a request from the control panel 315. In some embodiments, the website owner may identify (possibly via the control panel 315) malicious changes (i.e., hacked content) to the website 310 content. In some embodiments, the website owner may be notified as each change occurs.

A notification software module 360 running on the server(s) 210 may be configured to inform the website owner of the changes to the website 310. In some embodiments, the notification module 360 may be configured to notify the website owner (possibly via the control panel 315) of all updates to the website 310 content, either file content 330 or dynamic content 355. In some embodiments, the control panel 315 may be configured to receive from the website owner a selection of file content 330 or dynamic content 355 to notify the website owner of any changes specifically to that website 310 content.

If someone other than the website owner is responsible for the changes (i.e., malicious changes), the website owner may be notified and "roll back" the changes to a particular "commit" as described herein. In some embodiments, the website owner, or logic in the system, may identify patterns of identified malicious changes and automatically roll back these changes. In embodiments where the website 310 content has repeatedly and consistently been rolled back on specific file content 330 or dynamic content 355 received through specific file content 330, the notification module 360 may be configured to recognize specific website files or data derived from these website files which are repeatedly and consistently rolled back.

In some embodiments, the notification module 360 may be configured to recognize this website 310 content and only send notification to the website owner for the website 310 content which is consistently rolled back, thereby acting as a "tripwire" to notify the website owner of high risk website 310 content. In other embodiments, the server(s) 210 may be configured to automatically roll back the website 310 content to the last known good configuration (i.e., the last time the website owner rolled back the website 310 content).

Likewise, the system owner, or logic in the system may lock file content 330 or other website 310 content identified as containing malicious changes. In some embodiments, the control panel 315 may be configured to receive from the website owner selections to control the file content 330 and/or other website 310 content using a site lock module 365. The site lock module 365 may be configured to not allow any updates to the website files, during a certain period of time (e.g., while the website owner is on vacation) or from a certain IP address. Embodiments could be imagined in which the server(s) 210 are configured to automatically lock certain website files after determining that they are high risk files (e.g., they have been rolled back a threshold number of times, or because of this, were identified as a high risk file, content, etc.)

Any steps included in the embodiments illustrated in FIGS. 1-4 are not limited to their respective illustrated embodiments, and may be combined in several different orders and modified within multiple other disclosed embodiments. Likewise, the method steps disclosed herein may be accomplished by a software module executed on a server and/or client configured to accomplish that method step.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A system comprising a server hardware computing device coupled to a network and comprising at least one processor executing specific computer-executable instructions in a memory that, when executed, cause the system to:
   receive, from a first graphical user interface (GUI), a transmission encoding a modification to a website content, the modification including:
      an uploaded website file including a modification to, and sharing a file name with, a hosted website file within a website directory hosted on the server hardware computing device; or
      a first database command to create the modification, and a second database command to reverse the modification; or
   insert, into an electronic text file hosted in the website directory:
      the file name and a difference between the uploaded website file and the hosted website file; or
      the first database command and the second database command;
   render, for display on a second GUI, the website content including the modification;

receive, from a control panel displayed on the first GUI, a transmission including a request for a reversal of the modification;

reverse the modification by:
  deleting, from the electronic text file, the file name and the difference; or
  executing the second database command; and
render, for display on the second GUI, the hosted website file without the modification.

2. The system of claim 1, further comprising an interim software, executed on the server hardware computing device between an upload software and the website directory, the interim software comprising instructions causing the server hardware computing device, prior to rendering the website content, to:
  receive a transmission encoding a request to display the content;
  render a modified website file comprising the modification; and
  transmit the modified web site file to a second client hardware computing device.

3. The system of claim 1, wherein:
  the database command is imported from a database transaction log uploaded to the server hardware computing device; and
  the database query returns a dynamic content to be displayed within the website content.

4. The system of claim 1, wherein the electronic text file comprises a record of the modification, the record comprising:
  a user that requested the modification;
  the file name of the hosted website file or a database table queried;
  the content modified; and
  a time stamp indicating when the modification was executed.

5. The system of claim 1, wherein the at least one difference between the uploaded website file and the hosted website file is determined:
  line by line;
  character by character; or
  according to binary differences.

6. The system of claim 1, wherein a user interface selection control defines a change, a timestamp, or a version of the website for which the modification is to be reversed.

7. The system of claim 1, wherein the website directory comprises a website repository wherein an administrator of the website can commit, branch, merge and roll back a version of the website according to the modification inserted into the electronic text file.

8. The system of claim 7, wherein the control panel further comprises a plurality of website repository user interface controls receiving, from the administrator, at least one request to:
  commit, to the hosted website file, the at least one difference between the uploaded website file and the hosted website file;
  merge the uploaded website file and the hosted website file; or
  roll back the website repository to a particular time, date, commit or version of the website.

9. A method comprising:
  receiving, by a server hardware computing device coupled to a network and comprising at least one processor executing specific computer-executable instructions in a memory, from a first graphical user interface (GUI), a transmission encoding a modification to a website content, the modification including:
    an uploaded website file including a modification to, and sharing a file name with, a hosted website file within a website directory hosted on the server hardware computing device; or
    a first database command to create the modification, and a second database command to reverse the modification; or
  inserting, by the server hardware computing device, into an electronic text file hosted in the website directory:
    the file name and a difference between the uploaded website file and the hosted website file; or
    the first database command and the second database command;
  rendering, by the server hardware computing device, for display on a second GUI, the website content including the modification;
  receiving, by the server hardware computing device, from a control panel displayed on the first GUI, a transmission including a request for a reversal of the modification;
  reversing the modification, by the server hardware computing device, by:
    deleting, from the electronic text file, the file name and the difference; or
    executing the second database command; and
  rendering, by the server hardware computing device, for display on the second GUI, the hosted website file without the modification.

10. The method of claim 9, further comprising an interim software, executed on the server hardware computing device between an upload software and the website directory, the interim software comprising instructions causing the server hardware computing device, prior to rendering the website content, to:
  receive a transmission encoding a request to display the content;
  render a modified website file comprising the modification; and
  transmit the modified web site file to a second client hardware computing device.

11. The method of claim 9, wherein:
  the database command is imported from a database transaction log uploaded to the server hardware computing device; and
  the database query returns a dynamic content to be displayed within the website content.

12. The method of claim 9, wherein the electronic text file comprises a record of the modification, the record comprising:
  a user that requested the modification;
  the file name of the hosted website file or a database table queried;
  the content modified; and
  a time stamp indicating when the modification was executed.

13. The method of claim 9, wherein the at least one difference between the uploaded website file and the hosted website file is determined:
  line by line;
  character by character; or
  according to binary differences.

14. The method of claim 9, wherein a user interface selection control defines a change, a timestamp, or a version of the website for which the modification is to be reversed.

15. The method of claim 9, wherein the website directory comprises a website repository wherein an administrator of the website can commit, branch, merge and roll back a version of the website according to the modification inserted into the electronic text file.

16. The method of claim 15, wherein the control panel further comprises a plurality of website repository user interface controls receiving, from the administrator, at least one request to:
- commit, to the hosted website file, the at least one difference between the uploaded website file and the hosted website file;
- merge the uploaded website file and the hosted website file; or
- roll back the website repository to a particular time, date, commit or version of the web site.

* * * * *